(12) United States Patent
Gov et al.

(10) Patent No.: US 8,882,158 B2
(45) Date of Patent: Nov. 11, 2014

(54) HYBRID REDUNDANT SEAL FOR REFRIGERANT SYSTEMS

(71) Applicant: Honeywell International, Inc., Patent Services M/S AB/2B, Morristown, NJ (US)

(72) Inventors: Ricky G. Gov, Monterey Park, CA (US); Peter Zheng, Rancho Palos Verdes, CA (US); Ray Molina, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 50 days.

(21) Appl. No.: 13/749,625

(22) Filed: Jan. 24, 2013

(65) Prior Publication Data

US 2014/0203551 A1    Jul. 24, 2014

(51) Int. Cl.
| | | |
|---|---|---|
| *F16L 17/00* | (2006.01) | |
| *F16L 23/20* | (2006.01) | |
| *F16L 23/18* | (2006.01) | |
| *F16L 23/02* | (2006.01) | |
| *F16L 23/22* | (2006.01) | |

(52) U.S. Cl.
CPC .............. *F16L 23/20* (2013.01); *F16L 23/18* (2013.01); *F16L 23/02* (2013.01); *F16L 23/22* (2013.01); *Y10S 285/917* (2013.01)
USPC ............................ 285/368; 285/917; 285/351

(58) Field of Classification Search
USPC ................ 285/368, 124.4, 351, 917, 111
See application file for complete search history.

(56) References Cited

U.S. PATENT DOCUMENTS

| | | | | | |
|---|---|---|---|---|---|
| 4,877,272 | A | * | 10/1989 | Chevallier et al. | 285/111 |
| 5,118,141 | A | * | 6/1992 | Miyashita | 285/336 |
| 5,197,766 | A | * | 3/1993 | Glover et al. | 285/14 |
| 5,509,697 | A | * | 4/1996 | Phillips et al. | 285/136.1 |

FOREIGN PATENT DOCUMENTS

| | | |
|---|---|---|
| DE | 10163931 A1 | 7/2003 |
| FR | EP0851158 A1 | 7/1998 |
| JP | 2007192328 A | 8/2007 |

OTHER PUBLICATIONS

EP Search report received in EP 14151117.7 dated May 2, 2014.

* cited by examiner

*Primary Examiner* — Aaron Dunwoody
(74) *Attorney, Agent, or Firm* — Shimokaji & Associates P.C.

(57) ABSTRACT

A connection system for carrying a refrigerant may provide a hybrid redundancy in sealing a refrigerant flow from the surround system environment. The connection system may include a first sealing ring of a first type and a second sealing ring of a second type positioned downstream from the first sealing ring. In some embodiments, the first sealing ring may be in a groove positioned around the outside diameter of a male fitting. The second sealing ring may be positioned at an interface between the male fitting and a female fitting. In some embodiments, flanges of each fitting define the interface so that the second sealing ring may be positioned between the flanges of each fitting. The second sealing ring may be selected from a material that has a wider range of operating temperature than the first sealing ring so that in the event of failure in the first sealing ring, the second sealing ring may prevent leakage.

5 Claims, 1 Drawing Sheet

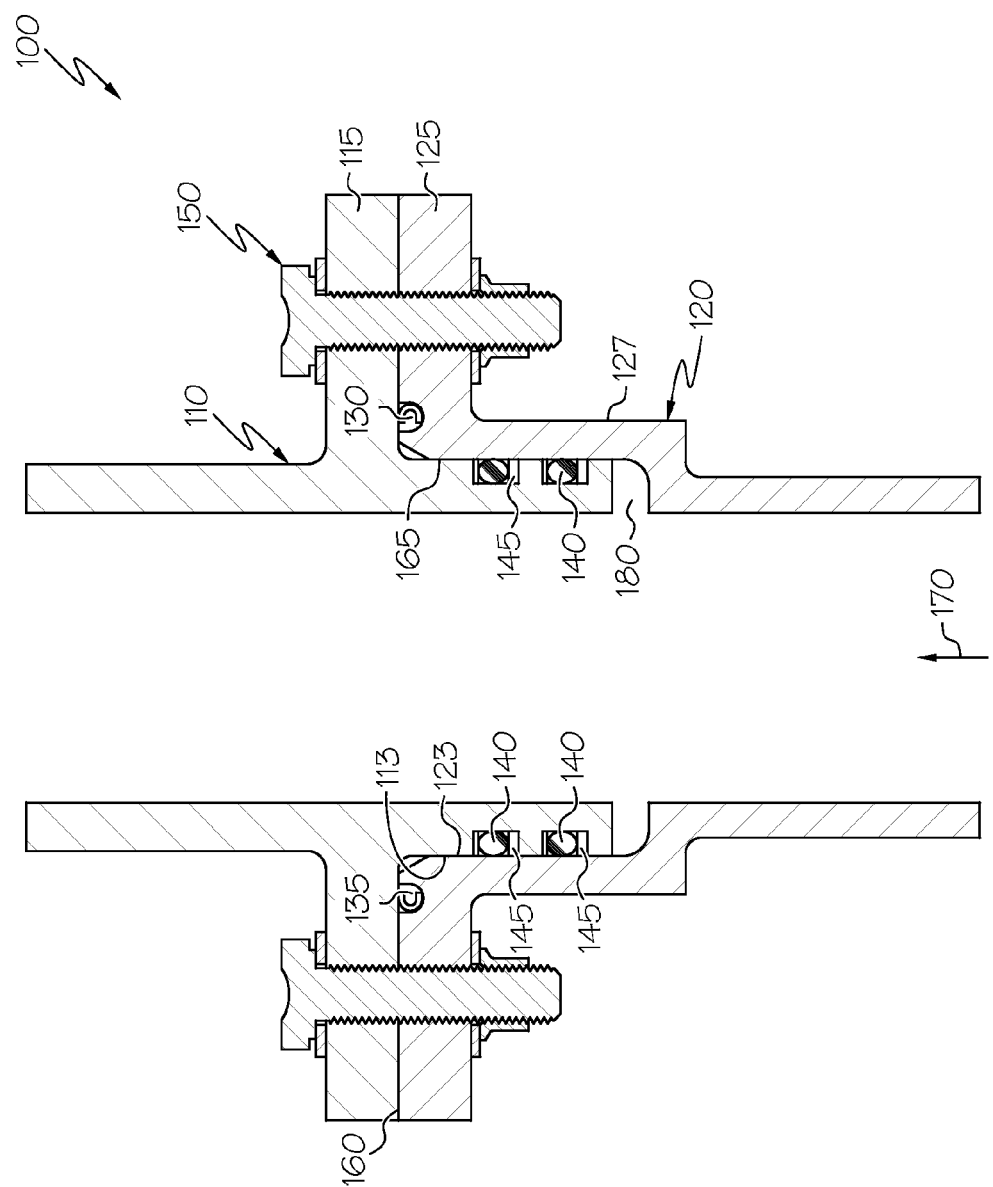

US 8,882,158 B2

HYBRID REDUNDANT SEAL FOR REFRIGERANT SYSTEMS

BACKGROUND OF THE INVENTION

The present invention generally relates to refrigerant systems and more particularly to a hybrid redundant seal for refrigerant systems.

Leakage may be a concern when designing refrigeration systems for aircraft applications and may result in a problem(s) that may hinder the performance of the system. Some systems use O-rings to seal all connections with a closed loop system. However in some aircraft, operating temperatures can reach the prescribed limits of an O-ring's functional capability which may leave very little margin of operating safety. Additionally, the available O-ring material selection can be very limited when used for compatibility with refrigerants that are used in the close loop systems.

As can be seen, there is a need for a seal system that can provide safe redundancy in aircraft refrigerant systems.

SUMMARY OF THE INVENTION

In one aspect of the present invention, a connection system for carrying a refrigerant flow comprises a male fitting including a first groove positioned around an outer diameter of the male fitting; a female fitting including an inner diameter disposed to receive the male fitting, the female fitting including a second groove at an interface of the male fitting to the female fitting; a first sealing ring in the first groove; and a metallic sealing ring in the second groove positioned downstream of the first sealing ring in the refrigerant flow.

In another aspect of the present invention, a connection system for carrying a refrigerant flow comprises a male fitting including a first groove and a second groove positioned around an outer diameter of the male fitting; a first flange projecting from the outer diameter of the male fitting; a female fitting including an inner diameter in receipt of the male fitting; a second flange projecting from the female fitting, wherein the second flange includes a third groove positioned at an interface between the first flange and the second flange; a first O-ring in the first groove abutting the inner diameter of the female fitting; a second O-ring in the second groove abutting the inner diameter of the female fitting; and a metallic sealing ring in the third groove, abutting the first and second flanges, and positioned downstream of the first and second O-rings in the refrigerant flow.

In still another aspect of the present invention, a connection system for carrying a refrigerant flow comprises a male fitting including an outer diameter; a first flange projecting from the outer diameter of the male fitting; a female fitting including an inner diameter in receipt of the male fitting; a second flange projecting from an outer diameter of the female fitting; a first sealing ring positioned in an interface between the outer diameter of the male fitting and the inner diameter of the female fitting; and a second sealing ring positioned between the first flange and the second flange, wherein the second sealing ring maintains operational integrity at a wider temperature range than the first sealing ring, and wherein the second sealing ring is positioned downstream of the first sealing ring in the refrigerant flow.

These and other features, aspects and advantages of the present invention will become better understood with reference to the following drawings, description and claims.

BRIEF DESCRIPTION OF THE DRAWINGS

The FIGURE is a cross-sectional side view of a connection system in accordance with an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a connection system with redundant sealing features to prevent leakage during operation in excessive temperatures. Embodiments of the connection system may protect, for example, refrigeration systems and the adjacent environment in aircraft where operation may occur in widely varying temperatures.

Referring now to the FIGURE, a connection system 100 is shown according to an exemplary embodiment of the present invention. The connection system 100 may include a male fitting 110 and a female fitting 120. An inner diameter 123 of the female fitting 120 may be configured for receipt of an outer diameter 113 of the male fitting 110. When adjoined, a refrigerant flow 170 may be passed from the female fitting 120 to the male fitting 110.

In some embodiments, the male fitting 110 may include one or more grooves 145. In the exemplary embodiment shown, the male fitting 110 includes two grooves 145 however it will be understood that more or less than two grooves 145 may be used. The grooves 145 may each hold a sealing ring 140. The sealing rings 140 may be for example, an O-ring that may abut the inner diameter 123 of the female fitting 120 when the male fitting 110 is adjoined to the female fitting 120. By positioning the sealing ring(s) 140 on the male fitting 110, the amount of squeezing placed on the sealing ring(s) 140 may be controlled to insure a secure seal. For example, the size of the groove 145 may be controlled so that the outer diameter of the sealing ring 140 may project just outside of the groove 145. Thus, the sealing ring 140 can be visually confirmed during installation to contact and press against the inner diameter 123 of the female fitting 120 providing a sealed fit. The male fitting 110 may include a flange 115.

The female fitting 120 may include a flange 125 projecting from an outer diameter 127 of the female fitting 120. The flange 125 may include a groove 135 at an interface 160 of the flange 115 to the flange 125. A sealing ring 130 may be positioned in the groove 135 abutting the flange 115. In an exemplary embodiment, the sealing ring 130 may be downstream of the sealing ring(s) 140 when the connection system 100 is carrying the refrigerant flow 170. The sealing ring 130 may be selected from a material that can maintain operational integrity at a wider range of temperatures than the sealing ring(s) 140. For example, the sealing ring 130 may be a metallic seal that can withstand higher or lower temperatures in the environment than an O-ring without deforming or rupturing during the transport of refrigerant flow 170.

In some embodiments, the male fitting 110 and female fitting 120 may be a threaded male boss and threaded female boss respectively. In some embodiments, the interface 160 may be defined by the connection of the flange 115 to the flange 125. A nut and bolt system 150 may couple the flanges 115 and 125 together providing control over the torque applied to the sealing ring 130 at the interface 160. In embodiments using threaded bosses, the connection between the male and female fittings 110;120 may be subject to vibration during operation of the aircraft. In some cases, the male fitting 110 may loosen from the female fitting 120 over time. The bolted flanges 115; 125 may prevent loosening of the male fitting 110 from the female fitting 120. Accordingly, the use of the nut and bolt system 150 in combination with the flanges 115;125 may maintain a tight seal at the interface 160.

During operation, the refrigerant flow 170 may flow from the female fitting 120 to the male fitting 110. Typically, a gap 180 exists between an end of the male fitting 110 and the interior of the female fitting 120. The refrigerant flow 170 may want to enter an interface 165 between the outer diameter 113 of the male fitting 110 and the inner diameter 123 of the female fitting 120. The sealing ring(s) 140 may typically prevent leakage through the interface 165. However, under excessive operating temperatures, the sealing ring(s) 140 may become compromised allowing refrigerant to flow through the interface 165. The sealing ring 130 may withstand the excessive operating temperatures, remain intact as an effective sealing member and thus prevent refrigerant from escaping out of the interface 160.

It should be understood, of course, that the foregoing relates to exemplary embodiments of the invention and that modifications may be made without departing from the spirit and scope of the invention as set forth in the following claims.

We claim:

1. A redundantly-sealed connection system for carrying a closed-loop flow of refrigerant in an aircraft, the system comprising:
    a male fitting including a first groove positioned around an outer diameter of the male fitting and a radially extending flange projecting from the outer diameter of the male fitting;
    a female fitting including an inner diameter disposed to receive the male fitting, said female fitting further including a radially extending flange projecting from the outer diameter of the female fitting, wherein the flange projecting from the outer diameter of the male fitting and the flange projecting from the outer diameter of the female fitting abut at an interface of the male fitting to the female fitting, the female fitting including a second groove at the interface of the male fitting to the female fitting;
    an aperture in the flange projecting from the outer diameter of the male fitting and an aperture in the flange projecting from the outer diameter of the female fitting, wherein said aperture in the flange projecting from the outer diameter of the male fitting and said aperture in the flange projecting from the outer diameter of the female fitting are configured to receive a nut and bolt securing the flange projecting from the outer diameter of the male fitting to the flange projecting from the outer diameter of the female fitting;
    a first sealing ring in the first groove, the first sealing ring being an O-ring; and
    a second sealing ring in the second groove,
    wherein the O-ring is compatible with the refrigerant;
    wherein the O-ring has operational integrity over a temperature range that is no greater than a nominal temperature range of the system;
    wherein the second sealing ring has operational integrity at a wider temperature range than the first sealing ring;
    wherein the second sealing ring is positioned to provide redundancy of sealing relative to the first sealing ring, and
    wherein the second sealing ring is metallic.

2. The connection system of claim 1, wherein the second sealing ring is positioned between the flange projecting from the outer diameter of the male fitting and the flange projecting from the outer diameter of the female fitting.

3. The connection system of claim 1, wherein the first sealing ring abuts the inner diameter of the female fitting.

4. A connection system for carrying a closed-loop flow of refrigerant, comprising:
    a male fitting including a first groove and a second groove positioned around an outer diameter of the male fitting;
    a flange projecting from the outer diameter of the male fitting;
    a female fitting including an inner diameter in receipt of the male fitting;
    a flange projecting from the outer diameter of the female fitting, wherein the flange projecting from the outer diameter of the female fitting, includes a third groove positioned at an interface between the flange projecting from the outer diameter of the male fitting and the flange projecting from the outer diameter of the female fitting;
    an aperture in the flange projecting from the outer diameter of the male fitting and an aperture in the flange projecting from the outer diameter of the female fitting wherein said aperture in the flange projecting from the outer diameter of the male fitting and the aperture in the flange projecting from the outer diameter of the female fitting are configured to receive a nut and bolt securing the flange projecting from the outer diameter of the male fitting to the flange projecting from the outer diameter of the female fitting;
    a first O-ring in the first groove wherein an outer diameter of the first O-ring projects outside of the first groove to abut the inner diameter of the female fitting;
    a second O-ring in the second groove wherein an outer diameter of the second O-ring projects outside of the second groove to abut the inner diameter of the female fitting; and
    a metallic sealing ring in the third groove, abutting the flange projecting from the outer diameter of the male fitting and the flange projecting from the outer diameter of the female fitting, said metallic sealing ring positioned to form a secure seal and to provide sealing redundancy for the first and second O-rings,
    wherein the first and second O-rings are compatible with the refrigerant, and
    wherein the first and second O-rings have operational integrity over a temperature range that is no greater than a nominal temperature range of the system.

5. The connection system of claim 4, wherein the metallic sealing ring maintains operational integrity at a higher operating temperature than the first and second O-rings.

* * * * *